S. COCANARI.
COLORED KINEMATOGRAPHIC FILM.
APPLICATION FILED JAN. 8, 1912.
1,102,878.
Patented July 7, 1914.
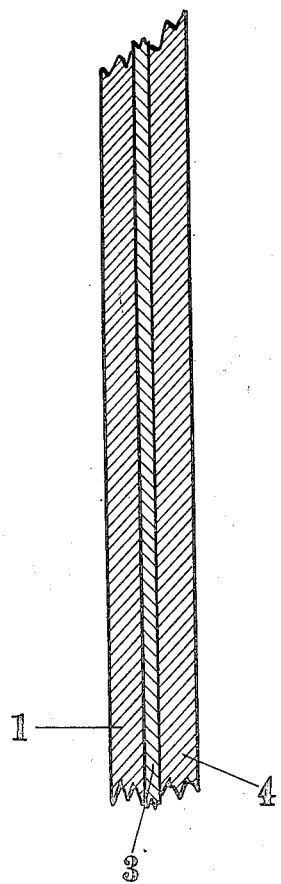
Witnesses:
Inventor:
Silvio Cocanari
per Y. Gevers
Attorney

UNITED STATES PATENT OFFICE.

SILVIO COCANARI, OF VIEUX-DIEU, BELGIUM.

COLORED KINEMATOGRAPHIC FILM.

1,102,878.  Specification of Letters Patent.  Patented July 7, 1914.

Application filed January 8, 1912. Serial No. 670,092.

*To all whom it may concern:*

Be it known that I, SILVIO COCANARI, technologist, a subject of the King of the Belgians, and resident of 152 Chaussée d'Anvers, Vieux-Dieu, Mortsel, Belgium, have invented a certain new and useful Colored Kinematographic Film, of which the following is a specification.

This invention has as its object the coloring of positive kinematographic films and consists in coloring the sensitive unprinted film at any period of its fabrication, on the support, so that before printing, (while in its original state), the film may have the color desired. This method of coloring may be carried out by chemical reaction or by physical and mechanical means. One method is to place the emulsion on a colored support.

For a long time the manufacturers of positive films have been giving to their films a general coloring by means of transparent colors, corresponding to the effects of light which they wish to obtain; for instance blue for night or water scene, green for a landscape, etc. This coloring is obtained by the immersion of the films in special baths (generally of anilin colors) after they are printed, developed and washed; the solution penetrates the moist gelatin and colors it. This method has many disadvantages:—(1) Extra manipulation and consequent delay in the finishing of the film. (2) Difficulty in obtaining a color of uniform intensity the entire length of the film; in fact the surplus coloring liquid flows toward the lower extremities of the film and causes spots of more intense color. (3) Extra material which is cumbersome and may only be used for one color because the frames upon which the films are rolled absorb the color. (4) Difficulty in obtaining the color desired, the intensity of the color when dry being different from that in the moist state. (5) All the different manipulations cause lines, scratches and spots to appear in greater numbers, because the films have to be handled in the wet state and transferred from the developing frame to the frame used for coloring and then onto another frame for drying. (6) This work must be done carefully and requires a large staff of employees.

One method of carrying out the object of this invention consists in coloring the film in its original state by interposing a coating of color between the support and the emulsion; either by coloring the support itself or in any other manner.

The colored support, coated with the sensitive emulsion, may be sold, thus supplying the manufacturers with a film in all shades and colors desired. The printing, developing, washing and all other ordinary manipulations require no special precautions, because the color of the films is not attacked. Furthermore the film is very quickly ready for the screen.

The further advantages are: (1) Greater transparency, fresher and more lasting colors. (2) Saving of time, labor and material. (3) Prevention of fraud i. e. at present the illegitimate reproduction of color films is very easily accomplished, because it is only necessary to remove the color by means of several prolonged washings and to take negatives. The films which are the object of this invention, on the contrary, can not have their color removed and thus the making of negatives therefrom is made impossible.

Referring to the drawing wherein the invention is illustrated by a view in section, the sensitive emulsion 1 is shown laid on a colored coating 3, placed on an ordinary support or film 4.

Having now particularly described and ascertained the nature of my said invention and in what manner the same is to be performed I declare that what I claim is:

Positive kinematographic film colored before it is printed the sensitive emulsion being laid onto an ordinary film coated with a colored sheet.

In witness whereof I have hereunto set my hand in the presence of two witnesses.

SILVIO COCANARI.

Witnesses:
  G. DE LERTY,
  N. ADAMS.